United States Patent
Otsuki et al.

(10) Patent No.: US 6,733,736 B2
(45) Date of Patent: May 11, 2004

(54) SILICON CARBIDE POWDER AND METHOD FOR PRODUCING THE SAME

(75) Inventors: Masashi Otsuki, Tokyo (JP); Shigeki Endo, Saitama-ken (JP)

(73) Assignee: Bridgestone Corporation, Tokyo (JP)

( * ) Notice: Subject to any disclaimer, the term of this patent is extended or adjusted under 35 U.S.C. 154(b) by 181 days.

(21) Appl. No.: 10/131,091

(22) Filed: Apr. 25, 2002

(65) Prior Publication Data

US 2002/0165078 A1 Nov. 7, 2002

(30) Foreign Application Priority Data

May 1, 2001 (JP) .................................. P2001-134526

(51) Int. Cl.$^7$ .............................................. C01B 31/36
(52) U.S. Cl. ......................... 423/345; 423/346; 501/88
(58) Field of Search ................................ 423/345, 346; 501/88

(56) References Cited

U.S. PATENT DOCUMENTS

| | | | |
|---|---|---|---|
| 4,302,372 A | * | 11/1981 | Fujiwara et al. ............... 501/88 |
| 5,783,255 A | * | 7/1998 | Suda et al. .................. 427/228 |
| 5,863,325 A | | 1/1999 | Kanemoto et al. |
| 6,251,353 B1 | * | 6/2001 | Kajiwara et al. ............ 423/345 |
| 6,627,169 B1 | * | 9/2003 | Itoh et al. ................... 423/345 |

FOREIGN PATENT DOCUMENTS

| | | |
|---|---|---|
| JP | 7-157307 | 6/1995 |
| JP | 9-48605 | 2/1997 |

* cited by examiner

*Primary Examiner*—N. M. Nguyen
(74) *Attorney, Agent, or Firm*—Sughrue Mion, PLLC

(57) ABSTRACT

A method of producing a silicon carbide powder comprising sintering a mixture containing at least a silicon source and a carbon source wherein the carbon source is a xylene-based resin. Preferable are an embodiment in which the above-mentioned silicon source is an alkoxysilane compound, an embodiment in which the above-mentioned alkoxysilane compound is selected from an ethoxysilane oligomer and an ethoxysilane polymer, an embodiment in which the above-mentioned mixture is obtained by adding an acid to a silicon source, then, by adding a carbon source, and other embodiments. A silicon carbide powder produced by the above-mentioned method of producing a silicon carbide powder wherein the nitrogen content is 100 ppm or less is preferable. A sintered silicon carbide obtained by sintering the above-mentioned silicon carbide powder wherein the volume resistivity is $1\times10^0$ Ω·cm or more.

12 Claims, No Drawings

SILICON CARBIDE POWDER AND METHOD FOR PRODUCING THE SAME

RELATED APPLICATION

This application claims benefit of priority under 35 USC 119 based on Japanese Patent Application P2001-134526, filed May 1, 2001, the entire contents of which are incorporated by reference herein.

BACKGROUND OF THE INVENTION

1. Field of the Invention

The present invention relates to a sintered silicon carbide which can be used as a semi-insulator or insulator and suitable for a semiconductor device and the like, a silicon carbide powder suitable for production of this sintered silicon carbide, and a method of producing a silicon carbide powder which can produce this silicon carbide powder efficiently.

2. Description of the Related Art

Silicon carbide show larger band gap and excellent in dielectric breakdown property, heat resistance, radiation resistance and the like as compared with silicon. Therefore, silicon carbide powders have been noticed as electronic device materials for portable high output semiconductors and the like, or as optical device materials owing to excellent optical properties, and sintered bodies thereof have been applied to electronic devices and the like.

As the method of producing the above-mentioned silicon carbide powder, there are a plurality of suggestions, however, a method of producing a silicon carbide powder having a content of impurity elements (elements belonging to group I to group XVII elements in the periodic table according to 1989, IUPAC, inorganic chemical nomenclature method, revision, and having an atomic number of 3 or more (excepting a carbon atom, nitrogen atom, oxygen atom and silicon atom)) of 1.0 ppm or less is not known well.

On the other hand, a sintered silicon carbide obtained by using a silicon carbide powder containing significant amount of a nitrogen atom and the like which are not included in the above-mentioned impurity elements can be utilized as an n-type semiconductor, and for designing a semiconductor, it is further required that the sintered silicon carbide forms a p-n junction together with a p-type semiconductor. However, a sintered silicon carbide which can be utilized as the above-mentioned p-type semiconductor is needed to have a small content of a nitrogen atom and the like which are not included in the above-mentioned impurity elements, and such a sintered silicon carbide is required to be produced by using a silicon carbide powder having a small content of a nitrogen atom and the like which are not included in the above-mentioned impurity elements, however, such as silicon carbide powder and a method of producing the same are not known under current conditions.

SUMMARY OF THE INVENTION

The present invention has been accomplished in view of such conditions, and a subject thereof is to attain the following object. Namely, an object of the present invention is to provide a sintered silicon carbide which has a small content of the above-mentioned impurity elements, has also a small content of elements such as nitrogen and the like not included in the above-mentioned impurity elements, can be used as a semi-insulator or insulator, and can be suitably used as a p-type semiconductor and the like. Another object of the present invention is to provide a silicon carbide powder suitable for production of the above-mentioned sintered silicon carbide, and a method of producing a silicon carbide powder which can produce the above-mentioned silicon carbide powder efficiently.

The objects of the present invention described above can be achieved by a method of producing a silicon carbide powder comprising sintering a mixture containing at least a silicon source and a carbon source wherein the carbon source is a xylene-based resin.

The objects of the present invention described above can also be achieved by the method of producing a silicon carbide powder described above, wherein the silicon source is an alkoxysilane compound.

The objects of the present invention described above can also be achieved by the method of producing a silicon carbide powder described above, wherein the alkoxysilane compound is selected from an ethoxysilane oligomer and ethoxysilane polymer.

The objects of the present invention described above can also be achieved by the method of producing a silicon carbide powder described above, wherein the mixture is obtained by adding an acid to a silicon source, then, adding to this a carbon source.

The objects of the present invention described above can also be achieved by the method of producing a silicon carbide powder described above, wherein the mixture is heated under a non-oxidizing atmosphere of 500 to 1000° C. before sintering.

The objects of the present invention described above can also be achieved by the method of producing a silicon carbide powder described above, wherein the mixture is prepared by adding a halogen compound in an amount of 0.5 to 5 mass % to the above-mentioned mixture.

The objects of the present invention described above can also be achieved by the method of producing a silicon carbide powder described above, wherein sintering is conducted by heating at a rate of 100 to 1000° C./h to 1300 to 1600° C., then, heating at a rate of 50 to 300° C./h to 1900 to 2100° C., then, keeping at 1900 to 2100° C. for 180 minutes or less, under a non-oxidizing atmosphere.

The objects of the present invention described above can also be achieved by the method of producing a silicon carbide powder described above, wherein the ratio of carbon contained in the carbon source to silicon contained in the silicon source in the mixture is 1.8 or less in sintering.

The objects of the present invention described above can also be achieved by the method of producing a silicon carbide powder described above, wherein a halogen or hydrogen halide is added in an amount of 1 to 5 vol % based on the silicon source and carbon source.

The objects of the present invention described above can also be achieved by the method of producing a silicon carbide powder described above, wherein post-treatment by heating is conducted after sintering.

The objects of the present invention described above can also be achieved by the method of producing a silicon carbide powder described above, wherein the post-treatment is conducted at 2150 to 2400° C.

The objects of the present invention described above can also be achieved by the method of producing a silicon carbide powder described above, wherein the post-treatment is conducted in an argon atmosphere for 3 to 8 hours.

The objects of the present invention described above can also be achieved by a silicon carbide powder produced by the method of producing a silicon carbide powder described above.

The objects of the present invention described above can also be achieved by the silicon carbide powder described above, wherein the nitrogen content is 100 ppm or less.

The objects of the present invention described above can also be achieved by the silicon carbide powder described above, wherein the nitrogen content is 50 ppm or less.

The objects of the present invention described above can also be achieved by the silicon carbide powder described above, wherein the content of impurity elements is 0.3 ppm or less.

The objects of the present invention described above can also be achieved by the silicon carbide powder described above, wherein the volume-average particle size ($D_{50}$) is 1 to 500 μm.

The objects of the present invention described above can also be achieved by the silicon carbide powder described above, wherein the particle size distribution ($D_{90}/D_{10}$) is 4 or less.

The objects of the present invention described above can also be achieved by a sintered silicon carbide obtained by sintering the silicon carbide powder described above.

The objects of the present invention described above can also be achieved by the sintered silicon carbide described above, wherein the volume resistivity is $1 \times 10^0$ Ω·cm or more.

The objects of the present invention described above can also be achieved by the sintered silicon carbide described above, wherein the volume resistivity is $1 \times 10^1$ Ω·cm or more.

The objects of the present invention described above can also be achieved by the method of producing a silicon carbide powder described above, wherein the silicon carbide powder has a nitrogen content of 100 ppm or less.

The objects of the present invention described above can also be achieved by the method of producing a silicon carbide powder described above, wherein the silicon carbide powder has a nitrogen content of 50 ppm or less.

The objects of the present invention described above can also be achieved by the method of producing a silicon carbide powder described above, wherein the silicon carbide powder has a content of impurity elements of 0.3 ppm or less.

The objects of the present invention described above can also be achieved by the method of producing a silicon carbide powder described above, wherein the silicon carbide powder has a volume-average particle size ($D_{50}$) of 1 to 500 μm.

The objects of the present invention described above can also be achieved by the method of producing a silicon carbide powder described above, wherein the silicon carbide powder has a particle size distribution ($D_{90}/D_{10}$) of 4 or less.

The objects of the present invention described above can also be achieved by the sintered silicon carbide described above, wherein the nitrogen content is 100 ppm or less.

The objects of the present invention described above can also be achieved by the sintered silicon carbide described above, wherein the nitrogen content is 50 ppm or less.

The objects of the present invention described above can also be achieved by the sintered silicon carbide described above, wherein the content of impurity elements is 0.3 ppm or less.

The present invention can provide a sintered silicon carbide which has a small content of the above-mentioned impurity elements, has also a small content of elements such as nitrogen and the like not included in the above-mentioned impurity elements, can be used as a semi-insulator or insulator, and can be suitably used as a p-type semiconductor and the like. The present invention also can provide a silicon carbide powder suitable for production of the above-mentioned sintered silicon carbide, and a method of producing a silicon carbide powder which can produce the above-mentioned silicon carbide powder efficiently.

DETAILED DESCRIPTION OF THE INVENTION

The method of producing a silicon carbide powder of the present invention includes at least sintering a mixture containing at least a silicon source and a carbon source, and if necessary, includes other treatments.

—Silicon Source— the above-mentioned silicon source, a silicon compound is mentioned.

The above-mentioned silicon compound may be liquid or solid, and these may be used together, and it is preferable to use at least one in the form of liquid.

As the above-mentioned compound in the form of liquid, alkoxysilane compounds and the like are preferably listed.

As the above-mentioned alkoxysilane compound, for example, alkoxysilanes, alkoxysilane oligomers, alkoxysilane polymers and the like are listed.

The alkoxysilane or alkoxysilane unit in the above-mentioned alkoxysilanes, the above-mentioned alkoxysilane oligomers and the above-mentioned alkoxysilane polymers may be any of monoalkoxysilanes, dialkoxysilanes, trialkoxysilanes and tetraalkoxysilanes, and tetraalkoxysilanes are preferable.

As the above-mentioned alkoxysilane, for example, methoxysilane, ethoxysilane, propoxysilane, butoxysilane and the like are listed, and of then, ethoxysilane is preferable from the standpoint of handling.

The above-mentioned alkoxysilane oligomer is a polymer having lower molecular weight having a degree of polymerization of about 2 to 15, and as the specific examples thereof, a methoxysilane oligomer, ethoxysilane oligomer, propoxysilane oligomer, butoxysilane oligomer and the like are listed, and of them, an ethoxysilane oligomer is preferable from the standpoint of handling.

The above-mentioned alkoxysilane polymer is a polymer having higher molecular weight having a degree of polymerization of over 15, and as the specific examples thereof, a methoxysilane polymer, ethoxysilane polymer, propoxysilane polymer, butoxysilane polymer and the like are listed, and of them, an ethoxysilane polymer is preferable from the standpoint of handling.

As the above-mentioned silicon compound in the form of solid, for example, silicon oxides such as SiO, silica sol (colloidal ultra-fine silica-containing liquid, containing OH group and alkoxyl group inside), silicon dioxides (silica gel, fine silica, quartz powder) and the like are listed.

In the present invention, the above-mentioned silicon compound may be used alone or in combination of two or more, and of the above-mentioned silicon compounds, an ethoxysilane oligomer, an ethoxysilane polymer, a mixture of an ethoxysilane oligomer and fine powdery silica, and the like are preferable owing to excellent uniformity and handling, and an ethoxysilane dimer, ethoxysilane polymer and the like are more preferable.

The above-mentioned silicon compound preferably has high purity, preferably has a content of impurity elements of 20 ppm or less, more preferably of 5 ppm or less.

Here, the above-mentioned impurity element includes elements belonging to group I to group XVI elements in the periodic table according to 1989, IUPAC, inorganic chemical nomenclature method, revision, and having an atomic number of 3 or more (excepting atomic numbers 6 to 8 and 14) (also in the following descriptions).

—Carbon Source—

The above-mentioned carbon source is a xylene-based resin. The above-mentioned xylene-based resin has small content of the above-mentioned impurity elements, and nitrogen is scarcely contained in the synthesis process thereof.

As the above-mentioned xylene-based resin, a xylene homopolymer (hereinafter, abbreviated simply as "xylene polymer"), xylene copolymer and the like are listed, and a xylene polymer is preferable from the standpoint of mixing of the above-mentioned impurity elements, and a resol type xylene polymer is more preferable.

The above-mentioned xylene-based resin may be appropriately synthesized or commercially available.

The above-mentioned xylene-based resin may be an oligomer or polymer, and the degree of polymerization thereof is not particularly restricted and can be appropriately selected depending on the object, and for example, in the case of the above-mentioned oligomer, the degree of polymerization is preferably from 3 to 15, and in the case of the above-mentioned polymer, the degree of polymerization is preferably from 15 to 1200.

The above-mentioned degree of polymerization can be measured, for example, by general gel permeation chromatography, osmotic pressure method, GC-MS and the like.

The above-mentioned xylene-based resin preferably has high purity, and the content of the above-mentioned impurity elements is preferably 20 ppm or less, and more preferably 5 ppm or less.

—Mixture— above-mentioned mixture contains the above-mentioned silicon source and the above-mentioned carbon source.

The ratio of the quantity of the above-mentioned silicon source and to the quantity of the above-mentioned carbon source in the above-mentioned mixture is not particularly restricted and can be appropriately selected depending on the object, and it is preferable that the quality ratio of the above-mentioned silicon source to the above-mentioned carbon source is previously determined so that the quality of free carbon in the resulted silicon carbide powder is small.

The amount of the above-mentioned free carbon can be controlled by appropriately regulating the ratio of carbon contained in the above-mentioned carbon source to silicon contained in the above-mentioned silicon source (hereinafter, ref erred to as "C/Si ratio") in the above-mentioned mixture.

Here, the above-mentioned C/Si ratio is represented by the following formula: C/Si=(quantity of the above-mentioned carbon source (g)×carbon remaining ratio/12.011)/0.4×(quantity of the above-mentioned silicon source (g)/60.0843)(wherein, the above-mentioned "quantity of carbon source" means, in the case of the carbon source in the form of solution, the quantity of the above-mentioned carbon source contained in the solution, and the above-mentioned quantity of silicon source means, in the case of the silicon source in the form of solution, the quantity of the above-mentioned silicon source contained in the solution).

The above-mentioned C/Si ratio can be measured by element analysis of a carbide intermediate obtained by carbonization of the above-mentioned mixture at 1000° C.

Stoichiometrically, the amount of the above-mentioned free carbon is 0% in a silicon carbide powder obtained when the above-mentioned C/Si ratio is 3.0, and actually, the above-mentioned free carbon may be generated even if the above-mentioned C/Si ratio is small by vaporization of a SiO gas generated simultaneously.

The method of preparing the above-mentioned mixture is not particularly restricted and can be appropriately selected depending on the object, and a method is particularly preferable in which, after addition of an acid to the above-mentioned silicon source, the above-mentioned carbon source is added. In this case, the above-mentioned silicon source and the above-mentioned carbon source can be mixed uniformly, and no generation of phase-separate condition is advantageous.

When, as the method of preparing the above-mentioned mixture, methods other than the method in which, after addition of an acid to the above-mentioned silicon source, the above-mentioned carbon source is added are adopted, the above-mentioned silicon source and the above-mentioned carbon source cannot be mixed uniformly and phase-separate condition may be generated, and in this case, the mixture in the above-mentioned phase-separated condition can be made into a uniform mixture by heating.

The above-mentioned mixture is usually prepared without addition of a halogen compound, and in the case of obtaining a silicon carbide powder having ultra-high purity, the mixture may also be prepared by addition of a halogen compound in an amount of 0.5 to 5 mass % based on the mixture.

When the above-mentioned halogen compound is added to the above-mentioned mixture, the above-mentioned impurity element mixed in the mixtures is halogenated and vaporizes and splashes by the following sintering, to be removed effectively, consequently obtaining a silicon carbide powder of ultra-high purity. Specifically, by adding the above-mentioned halogen compound, each content of the above-mentioned impurity elements in the resulted silicon carbide powder can be controlled to 0.1 ppm or less.

When the above-mentioned halogen compound is added, it is preferable to react the above-mentioned mixture near the decomposition temperature of the added halogen compound for 10 to 30 minutes and to heat the mixture to the temperature for the next sintering, from the standpoint of removal of the above-mentioned impurity element.

Regarding the above-mentioned halogen compound, when the above-mentioned is liquid, a liquid halogen compound such as ammonium chloride, hydrochloric acid aqueous solution and the like is preferably added to the mixture, and when the above-mentioned is solid (when a thermoplastic phenol resin, furan resin or the like is contained as the above-mentioned carbon source, and a solid compound is contained as the above-mentioned silicon source), a solid halogen compound such as a halogen-containing polymer such as polyvinyl chloride, chlorinated polyethylene, polychloroprene and the like is preferably added to the mixture.

The above-mentioned mixture may be solid or liquid, and in the case of liquid, the mixture may be hardened, before the above-mentioned sintering, to give a solid product.

The above-mentioned hardening method is not particularly restricted, and can be appropriately selected depending on the object, and for example, a method of cross-linking by heating, a method of hardening with a hardening catalyst, methods using electronic beam and radiation, and the like are listed.

The above-mentioned heating is conducted at temperatures of about 50° C. or more for about 1 hour or more.

The above-mentioned hardening catalyst is not particularly restricted and can be appropriately selected depending on the object, and for example, acids such as toluenesulfonic acid, toluenecarboxylic acid, acetic acid, oxalic acid, hydrochloric acid, sulfuric acid and the like, amines such as hexamine and the like, are listed.

The above-mentioned mixture is preferably heated at 500 to 1000° C. under a non-oxidizing atmosphere before the above-mentioned sintering, and more preferably heated at 500 to 600° C. under a non-oxidizing atmosphere for 10 to 30 minutes, then, heated at 800 to 1000° C. under a non-oxidizing atmosphere for 30 minutes to 2 hours.

The above-mentioned non-oxidizing atmosphere is not particularly restricted and can be appropriately selected depending on the object, and for example, atmospheres of nitrogen, argon and the like are listed.

—Sintering—

The above-mentioned sintering is not particularly restricted in method, conditions and the like thereof, and can be appropriately selected depending on the particle size of the intended silicon carbide powder, and the like, and from the standpoint of more efficient production of a silicon carbide powder, it is preferable that the above-mentioned mixture is heated, under a non-oxidizing atmosphere, at a rate of 100 to 1000° C./h to 1300 to 1600° C., then, heated at a rate of 50 to 300° C./h to 1900 to 2100° C., then, kept at 1900 to 2100° C. for 180 minutes or shorter.

In the above-mentioned sintering, it is preferable that the temperature rising rate in heating to 1300 to 1600° C. is larger than the temperature rising rate in heating to 1900 to 2100° C.

By heating the above-mentioned mixture to 1900 to 2100° C., a carbide of silicon and carbon is obtained. In this case, the yield of the above-mentioned carbide based on the above-mentioned mixture is not particularly restricted, and higher is more preferable, and this yield is preferably 50 mass % or more.

The above-mentioned non-oxidizing atmosphere is not particularly restricted and can be appropriately selected depending on the object, and for example, atmospheres of inert gases such as nitrogen, argon and the like are listed, and an argon atmosphere is preferable since it is non-reactive even at higher temperature.

In the above-mentioned sintering, it is preferable to introduce the above-mentioned inert gas into a reaction vessel accommodating the above-mentioned mixture. This case is advantageous since a SiO gas, CO gas and the like containing the above-mentioned impurity elements generating in the above-mentioned sintering can be discharged or removed out of the above-mentioned reaction vessel.

In the above-mentioned sintering, addition of a halogen or hydrogen halide in an amount of 1 to 5 vol % based on the above-mentioned silicon source and the above-mentioned carbon source is preferable since then the quantity of the above-mentioned impurity elements contained in the resulted silicon carbide powder can be controlled.

The above-mentioned C/Si ratio in the above-mentioned sintering cannot be generically defined since it can vary depending on the pressure in the above-mentioned sintering, and is preferably 1.85 or less, more preferably 1.55 or less sine then generation of the above-mentioned free carbon can be suppressed effectively.

—Other Treatment—

The above-mentioned other treatment is not particularly restricted and can be appropriately selected depending on the object, and for example, the following post-treatment and the like are preferably listed.

The above-mentioned post-treatment is conducted, after the above-mentioned sintering, preferably at 2000° C. or more, more preferably at 2100° C. or more, particularly preferably at 2150 to 2400° C.

The time of the above-mentioned post-treatment is not particularly restricted and can be appropriately selected depending on the object, and usually 5 minutes or more, preferably from about 3 to 8 hours, more preferably from about 4 to 6 hours.

The above-mentioned post-treatment is preferably conducted under the above-mentioned non-oxidizing atmosphere, and among the non-oxidizing atmospheres, an argon atmosphere is preferable since it is non-reactive even at high temperature.

The above-mentioned post-treatment is advantageous in that the above-mentioned impurity elements are removed, purity is high, particle size is large, particle size distribution is narrow, and a silicon carbide powder of high quality is obtained.

The apparatus and the like used in the method of producing the above-mentioned silicon carbide powder is not particularly restricted and can be appropriately selected depending on the object.

The method of producing the above-mentioned silicon carbide powder may be conducted in continuous mode or batch-wise mode. Further, the above-mentioned sintering and the above-mentioned post-treatment may be conducted continuously in one heating furnace, or conducted batch-wise in separate heating furnaces.

(Silicon Carbide Powder)

The silicon carbide powder of the present invention is produced by the above-mentioned method of producing a silicon carbide powder of the present invention.

The above-mentioned silicon carbide powder contains β-SiC in an amount preferably of 70 mass % or more, more preferably of 80 mass % or more, in view of isotropy of electric conduction, isotropy of heat conduction and the like.

Whether this β-SiC or not can be judged from matching peak in ATSM library data, and the like.

The volume-average particle size ($D_{50}$) of the above-mentioned silicon carbide powder is preferably from 1 to 500 μm, more preferably from 1 to 10 μm.

It is advantage that the above-mentioned volume-average particle size ($D_{50}$) is within the above-mentioned numerical value range since then handling thereof is easy and packing in molding is dense and successful, when applied to a sintered silicon carbide.

The particle size distribution ($D_{90}/D_{10}$) (based on volume-average particle size) of the above-mentioned silicon carbide powder is preferably 4.0 or less, more preferably 3.5 or less from the standpoint of uniformity of the above-mentioned silicon carbide powder.

Each content of the above-mentioned elements in the above-mentioned silicon carbide powder is preferably 0.3 ppm or less, more preferably 0.1 ppm or less.

The nitrogen content in the above-mentioned silicon carbide powder is preferably 100 ppm or less, more preferably 50 ppm or less, particularly preferably 40 ppm or less.

In this case, when the silicon carbide powder is sintered, a sintered silicon carbide which is a semi-insulator or insulator is obtained, and the sintered silicon carbide can be suitably utilized as a p-type semiconductor and the like, advantageously.

The above-mentioned can be measured, for example, using an oxygen and nitrogen simultaneous analysis apparatus and the like.

The silicon carbide powder of the present invention has high purity, large particle size and narrow particle size distribution, therefore, it can be suitably used in various fields, and particularly suitably applied to the sintered silicon carbide of the present invention.

(Sintered Silicon Carbide)

The sintered silicon carbide of the present invention is obtained by sintering the above-mentioned silicon carbide powder of the present invention.

The above-mentioned sintering method is not particularly restricted and can be appropriately selected depending on the object, and for example, it may be a reactive sintering method or hot press method, and sintering conditions and the like can be appropriately selected depending on the object.

The volume resistivity of the above-mentioned sintered silicon carbide is preferably $1 \times 10^0$ $\Omega \cdot$cm or more, more preferably $1 \times 10^1$ $\Omega \cdot$cm or more.

When the above-mentioned volume resistivity is $1 \times 10^0$ $\Omega \cdot$cm or more, the above-mentioned sintered silicon carbide is semi-insulating or insulating.

The bending strength of the above-mentioned sintered silicon carbide differs depending on application and the like, and generally, the value measured according to the bending strength test method (JIS 1601) is preferably 600 MPa or more, and more preferably 650 MPa or more.

The heat conductivity of the above-mentioned sintered silicon carbide differs depending on application and the like, and generally, preferably 100 W/m·K or more, more preferably 180 W/m·K or more.

The above-mentioned heat conductivity can be measured by a laser flash method using a heat constant measuring apparatus (FA8510B, manufactured by Rigaku Denki K.K.).

The density of the above-mentioned sintered silicon carbide differs depending on application and the like, and generally, preferably 2.9 g/cm$^3$ or more, more preferably 3.0 g/cm$^3$ or more.

When the above-mentioned density is less than 2.9 g/cm$^3$, mechanical strength decreases, and when used repeatedly, deformation, and failures such as crack and the like may be caused. Further, heat resistance, oxidation resistance and chemical resistance also decrease, leading to a tendency of corrosion in some cases.

The above-mentioned can be measured by an Archimedes' method.

The surface roughness (Ra) of the above-mentioned sintered silicon carbide differs depending on application and the like, and generally, preferably from 0.01 to 2.0 μm.

When the surface roughness (Ra) is within the above-mentioned range, generation of particles can be further prevented, desirably.

The surface roughness (Ra) can be measured using a surface roughness meter.

The content of β-SiC in the above-mentioned sintered silicon carbide differs depending on application and the like, and in general, preferably 70 mass % or more, more preferably 80 mass % or more based on the silicon carbide all components, from the standpoint of enhancement of isotropy of mechanical strength, and the like.

The Young's modulus the above-mentioned sintered silicon carbide differs depending on application and the like, and in general, preferably from $3.5 \times 10^4$ to $4.5 \times 10^4$ kgf/mm$^2$ ($3.4 \times 10^5$ to $4.4 \times 10^5$ MPa).

The Vickers hardness of the above-mentioned sintered silicon carbide differs depending on application and the like, and in general, preferably 2000 kgf/mm$^2$ (18000 to 20000 MPa) or more.

The Poisson's ratio of the above-mentioned sintered silicon carbide differs depending on application and the like, and in general, preferably from 0.14 to 0.21.

The thermal expansion coefficient of the above-mentioned sintered silicon carbide differs depending on application and the like, and in general, preferably from $3.8 \times 10^{-6}$ to $4.2 \times 10^{-6}$/K.

The specific feat of the above-mentioned sintered silicon carbide differs depending on application and the like, and in general, preferably from 0.15 to 0.18 cal/g·K.

The total content of the above-mentioned impurity elements of the above-mentioned sintered silicon carbide is preferably 1.0 ppm or less, more preferably 0.8 ppm or less.

When the total content of the above-mentioned impurity elements is 1.0 ppm or less, the sintered silicon carbide can be suitably used as a high performance wafer in various fields.

The content of the above-mentioned impurity elements can be measured by analysis by ICP-MS of a solution obtained by decomposition of all of the above-mentioned sintered silicon carbide with a strong acid.

The sintered silicon carbide of the present invention has a small content of the above-mentioned impurity elements and also has a small content of elements such as nitrogen and the like not included in the above-mentioned impurity elements, and can be used widely in various fields as a semi-insulator or insulator, and can be used particularly suitably as a p-type semiconductor and the like.

EXAMPLES

The following examples illustrate the present invention, but do not limit the scope of the invention at all.

Example 1

—Production of Silicon Carbide Powder—

34 g of high purity maleic acid was added as a catalyst to 212 g of high purity tetraethoxysilane having a SiO$_2$ content of 40 mass %, then, to this was mixed 127 g of a resol type xylene resin in the form of 50 mass % high purity liquid (manufactured by Mitsubishi Gas Chemical Co., Inc., Nikanol PR-1440M), to give a glutinous mixed of high viscosity. This glutinous mixture was thermally hardened at 70° C., to obtain homogenous resinous solid. 300 g of this resinous solid was carbonized at 900° C. in vacuo for 1 hour, to obtain 129 g of a carbide (yield: 43%). The above-mentioned C/Si ratio in the above-mentioned resinous solid was (127 g×0.5×0.4/12.011)/(0.4×212 g/60.0843)=1.5 by calculation and was 1.53 by element analysis.

18.4 g of this carbide was placed in a carbon vessel, and heated to 1900° C. under an argon atmosphere, and kept for 4 hours, to obtain a silicon carbide powder of high purity (100 mass % β-SiC). The resulted silicon carbide powder was yellowish green.

The nitrogen content of this silicon carbide powder was measured using an oxygen nitrogen simultaneous analysis apparatus (manufactured by LECO, TC436) to find it was less than 40 ppm.

For analysis of the above-mentioned impurity elements in this silicon carbide powder, the silicon carbide powder was thermally decomposed under pressure with a mixed acid containing hydrofluoric acid, nitric acid and sulfuric acid, then, the analysis was conducted by an ICP-mass spectrometry method and frameless atomic absorption method, to find that the contents of the above-mentioned impurity elements, B, Na, K, Al, Cr, Fe, Ni, Cu, W, Ti and Ca were all 0.1 ppm or less.

The volume-average particle size ($D_{50}$) and particle size distribution ($D_{90}/D_{10}$) (based on volume-average particle size) of the silicon carbide powder were measured by a particle size distribution measurement apparatus (COULTER LS230), to find that the volume-average particle size ($D_{50}$) was 2 μm and the particle size distribution ($D_{90}/D_{10}$) (based on volume-average particle size) was 3.0, and the distribution formed one mountain.

—Production of Sintered Silicon Carbide—

The resulted silicon carbide powder was sintered as described below, to produce a sintered silicon carbide. Namely, about 6500 g of the above-mentioned silicon carbide powder was accommodated into a graphite mold having an internal diameter of 320 mmφ, and this was sandwiched by graphite punches, and set in a hot press (hot press apparatus: resistance heat mode 400 t hot press). Under vacuum ($10^{-5}$ to $10^{-4}$ Torr ($1.3 \times 10^{-2}$ to $1.3 \times 10^{-3}$ Pa)), the sintered silicon carbide was heated from 700° C. to 1200° C. over 3 hours, further heated from 1200° C. to 1500° C. over 3 hours, and kept at this temperature for 4 hours. Then, the sintered silicon carbide was pressed at a pressure of 500 kgf/cm$^2$ (49 MPa), and heated from 1500° C. to 2300° C. over 4 hours under an argon atmosphere, and kept at this temperature and pressure for 3 hours (hot press process), then, cooled. Then, the sintered silicon carbide was kept at 1950° C. for 3 hours under vacuum ($10^{-4}$ Torr ($1.3 \times 10^{-2}$ Pa)) in a heat treatment furnace, to produce a sintered silicon carbide.

The resulted sintered silicon carbide was thermally decomposed under press with a mixed acid containing hydrofluoric acid and nitric acid, and the resulted solution was concentrated by 10-fold or more, and the above-mentioned impurity elements were analyzed using ICP-mass spectrometry and flameless atomic absorption analysis, to find that the contents of the above-mentioned impurity elements, B, Na, K, Al, Cr, Fe, Ni, Cu, W, Ti and Ca were all 15 ppm or less.

Comparative Example 1

A silicon carbide powder was produced in the same manner as in Example 1 except that the resol type xylene resin was replaced by a resol type phenol resin in Example 1, and a sintered silicon carbide was produced by using this silicon carbide powder, and the same evaluation as in Example 1 was conducted, to obtain the same results as in Example 1. However, the nitrogen content in the resulted silicon carbide powder was 500 ppm or more.

What is claimed is:

1. A method of producing a silicon carbide powder comprising sintering a mixture containing at least a silicon source and a carbon source, wherein the carbon source is a xylene-based resin, and a nitrogen content of the SIC powder product is 100 ppm or less.

2. The method of producing a silicon carbide powder according to claim 1, wherein the silicon source is an alkoxysilane compound.

3. The method of producing a silicon carbide powder according to claim 2, wherein the alkoxysilane compound is selected from an ethoxysilane oligomer and ethoxysilane polymer.

4. The method of producing a silicon carbide powder according to claim 1, wherein the mixture is obtained by adding an acid to a silicon source, then, adding to this a carbon source.

5. The method of producing a silicon carbide powder according to claim 1, wherein the mixture is heated under a non-oxidizing atmosphere of 500 to 1000° C. before sintering.

6. The method of producing, silicon carbide powder according to claim 1, wherein the mixture is prepared by adding a halogen compound in an amount of 0.5 to 5 mass % to the above-mentioned mixture.

7. The method of producing a silicon carbide powder according to claim 1, wherein sintering is conducted by heating at a rate of 100 to 1000° C./h to 1300 to 1600° C., then, heating at a rate of 50 to 300° C./h to 1900 to 2100° C., then, keeping at 1900 to 2100° C. for 180 minutes or less, under a non-oxidizing atmosphere.

8. The method of producing a silicon carbide powder according to claim 1, wherein the ratio of carbon contained in the carbon source to silicon contained in the silicon source in the mixture is 1.8 or less in sintering.

9. The method of producing a silicon carbide powder according to claim 1, wherein a halogen or hydrogen halide is added in an amount of 1 to 5 vol % based on the silicon source and carbon source.

10. The method of producing a silicon carbide powder according to claim 1, wherein post-treatment by heating is conducted after sintering.

11. The method of producing a silicon carbide powder according to claim 10, wherein the post-treatment is conducted at 2150 to 2400° C.

12. The Method of producing a silicon carbide powder according to claim 10, wherein the post-treatment is conducted in an argon atmosphere for 3 to 8 hours.

* * * * *